(12) United States Patent
Iida et al.

(10) Patent No.: US 6,680,929 B1
(45) Date of Patent: Jan. 20, 2004

(54) BASE STATION, A TERMINAL AND A METHOD FOR COMMUNICATING BETWEEN THEM

(75) Inventors: Noboru Iida, Tokyo (JP); Noritaka Fukagawa, Shizuoka (JP); You Ueno, Shizuoka (JP); Takashi Watanabe, 347-1-801 Aritama Minamimachi, Hamamatsu, Shizuoka 431-3122 (JP); Tadanori Mizuno, Shizuoka (JP)

(73) Assignees: Mitsubishi Denki Kabushiki Kaisha, Tokyo (JP); Takashi Watanabe, Shizuoka (JP)

( * ) Notice: Subject to any disclaimer, the term of this patent is extended or adjusted under 35 U.S.C. 154(b) by 0 days.

(21) Appl. No.: 09/389,322

(22) Filed: Sep. 3, 1999

(30) Foreign Application Priority Data

Mar. 5, 1999 (JP) ............................................ 11-058286

(51) Int. Cl.$^7$ ............................. H04B 7/212; H04J 3/00
(52) U.S. Cl. ...................... 370/348; 370/337; 370/347; 370/442
(58) Field of Search ................................ 370/347, 345, 370/341, 337, 336, 348, 321, 442, 443, 444, 447; 455/561, 423

(56) References Cited

U.S. PATENT DOCUMENTS

| | | | |
|---|---|---|---|
| 5,995,500 A | * 11/1999 | Ma et al. ..................... | 370/337 |
| 6,031,827 A | * 2/2000 | Rikkinen et al. ............ | 370/330 |
| 6,047,178 A | * 4/2000 | Frlan .......................... | 455/423 |
| 6,240,083 B1 | * 5/2001 | Wright et al. ............... | 370/348 |

FOREIGN PATENT DOCUMENTS

| | | |
|---|---|---|
| JP | 5-102918 | 4/1993 |
| JP | 9-130854 | 5/1997 |
| JP | 10-248088 | 9/1998 |

OTHER PUBLICATIONS

Tomasz Imielinski et al., "Wireless Computing", Communications of the ACM, Oct. 1994, vol. 37, No. 10, pp. 19–28.
Fouad A. Tobagi, "Multiaccess Protocols in Packet Communication Systems", IEEE Transactions on Communications, Apr. 1980, vol. COM–28, No. 4, pp. 468–488.
Norman Abramson, "The Aloha System—Another Alternative for Computer Communications", University of Hawaii 1970, pp. 281–285.
Leonard Kleinrock, "Packet Switching in Radio Channels: Part I—Carrier Sense Multiple–Access Modes and Their Throughput–Delay Characteristics", IEEE Transactions on Communications, Dec. 1975, vol. COM–23, No. 12, pp. 1400–1416.
Fouad A. Tobagi et al., "Packet Switching in Radio Channels: Part II—The Hidden Terminal Problem in Carrier Sense Multiple–Access and the Busy–Tone Solution", IEEE Transactions on Communications, Dec. 1975, vol. COM–23, No. 12, pp. 1417–1433.

(List continued on next page.)

Primary Examiner—Vivian Chin
Assistant Examiner—Raymond B Persino
(74) Attorney, Agent, or Firm—Birch, Stewart, Kolasch & Birch, LLP

(57) ABSTRACT

Preferred embodiments of this invention provide a base station and a terminal appropriate for a protocol for realizing a high performance and a low delay by relaying in a base station only if a direct transmission is not performed between terminals and omitting a data transmission channel for relaying if the direct transmission is performed. When a receiver terminal receives data directly from a sender terminal, the receiver terminal transmits a report of a direct receipt of the data to the base station. When the base station receives the report of the direct receipt of the data, the base station omits the data transmission channel for relaying.

15 Claims, 12 Drawing Sheets

OTHER PUBLICATIONS

John I. Capetanakis, "Tree Algorithms for Packet Broadcast Channels", IEEE Transactions on Information Theory, Sep. 1979, vol. IT–25, No. 5, pp. 505–515.

Chane L. Fullmer et al., "Floor Acquisition Multiple Access (FAMA) for Packet–Radio Networks", Sigcomm '95, pp. 262–273.

Chane L. Fullmer et al., "FAMA–PJ: A Channel Access Protocol for Wireless LANs", Mobicom '95, 1995, pp. 76–85.

Rodrigo Garces et al., "Floor Acquisition Multiple Access with Collision Resolution", Mobicom '96, 1996, pp. 187–197.

Rodrigo Garces et al., "Collision Avoidance and Resolution Multiple Access with Transmission Groups", IEEE 1997.

Mark J. Karo et al., "Distributed–Queueing Request Update Multiple Access (DQRUMA) for Wireless Packet (ATM) Networks", IEEE 1995, pp. 1224–1231.

Miki Yamamoto et al., "Access Control Scheme for Multimedia Wireless ATM Local Area Networks", Osaka University, Department of Communications Engineering.

D.J. Goodman et al., "Packet Reservation Multiple Access for Local Wireless Communications", IEEE Transactions on Communications, Aug. 1989, vol. 37, No. 8, pp. 885–890.

Jonathan DeVile, "A Reservation Multiple Access Scheme for an Adaptive TDMA Air–Interface", Roke Manor Research Limited, pp. 133–144.

G. Anastasi et al., "A Bandwidth Reservation Protocol for Speech/Data Integration in TDMA–Based Advanced Mobile Systems", IEEE 1996, pp. 722–729.

Giuseppe Anastasi et al., "An Access Protocol for Speech/Data/Video Integration in TDMA–Based Advanced Mobile Systems", IEEE Journal on Selected Areas in Communications, Oct. 1997, vol. 15, No. 8, pp. 1498–1510.

Noboru Iida et al., "A Study of Multiple Access Protocol Via Wireless Networks", Sep. 1998, Communications Society Conference of IEICE.

* cited by examiner (1ATM CELL/MESSAGE, RATE OF OUTSIDE CELL 0%)

(2ATM CELL/MESSAGE, RATE OF OUTSIDE CELL 0%)

(1ATM RATE OF OUTSIDE CELL 0%, DIRECT COMM. SUCCESS RATE 0%)

(1ATM CELL/MESSAGE, RATE OF OUTSIDE CELL 30%)

(2ATM CELL/MESSAGE, RATE OF OUTSIDE CELL 30%)

BASE STATION, A TERMINAL AND A METHOD FOR COMMUNICATING BETWEEN THEM

BACKGROUND OF THE INVENTION

1. Field of the Invention

This invention relates to a base station and a terminal configuring a wireless network, and a communication method. This invention relates to the base station, terminal, and communication method suitable for a multiple access protocol for maximizing a utilization of a frequency band and realizing a maximum throughput and a minimum delay, for example.

2. Description of the Related Art

The multiple access protocol in a wireless network is expected to maximize the utilization of the frequency band and realize the maximum throughput and the minimum delay ("Mobile Wireless Computing: Challenge in Data Management" by T. Imielinski and B. R. Badrinacth, Commun. ACM, vol. 37, pp. 18–28, October 1994 (related art 1)).

Several studies have been made on the multiple access protocol for broadcast channels, e.g., a wireless network, communication satellite, etc. ("Data Networks" by D. Bertsekas and R. Gallager, Second Edition, Prentice-Hall, 1992 (related art 2)), ("Multiaccess Protocols in Packet Communication Systems" by F. A. Tobagi, IEEE Trans Commun. Vol. COM-28, pp. 468–488, April 1980 (related art 3)), ("The ALOHA System—Another Alternative for Computer Communications" by N. Abramson in 1970 Fall Joint Comput. Conf. AFIPS Conf. Proc. Vol. 37. Montvale, N.J.: AFIPS Press, pp. 281–285, 1970 (related art 4)), ("Packet Switching in Radio Channels: Part I—Carrier Sense Multiple-Access Modes and their Throughput-Delay Characteristics" by L. Kleinrock and F. A. Tobagi, IEEE Trans. Commun., vol. COM-23, pp. 1400–1416, December 1975 (related art 5)), ("Packet Switching in Radio Channels: Part II—the Hidden Terminal Problem in Carrier Sense Multiple-Access and the Busy-Tone Solution" by F. A. Tobagi and L. Kleinrock, IEEE Trans. Commun., vol. COM 23, pp. 1417–1433, December 1975 (related art 6)), ("Tree Algorithms for Packet Broadcast Channels" by J. I. Capetanakits, IEEE Trans. Information Theory, vol. IT-25, September 1979 (related art 7)).

Among recent studies on the multiple access method using a wireless channel, as a distributed control method, FAMA for confirming an acquisition of a transmission right between a sender terminal and a receiver terminal for preventing a drop in a throughput due to a hidden terminal is proposed by Fullmer, etc. in addition to CSMA/CD (Carrier Sense Multiple Access/Collision Detection) ("Floor Acquisition Multiple Access (FAMA) for Packet-Radio Networks" by C. L. Fullmer and J. J. Garcia-Luna-Aceves, Proc. ACM SIGCOM 95, Cambridge, Mass., Aug. 30–Sep. 1, 1995 (related art 8)). FAMA-PJ (Floor Acquisition Multiple Access with Pauses and Jamming), an improved version of the FAMA, in which jamming is provided for preventing a propagation delay and a collision due to a transmission timing in the CSMA/CD, is proposed ("FAMA-PJ: A Channel Access Protocol for Wireless LANs" by C. L. Fullmer and J. J. Garcia-Luna-Aceves, Proc. ACM MOBICOM 95, pp. 76–85, 1995 (related art 9)).

As a centralized control method, CARMA (Collision Avoidance and Resolution Multiple Access) for transmitting a control command of the FAMA using a stack algorithm (also called as a tree algorithm) is proposed by R. Garces, etc. ("Floor Acquisition Multiple Access with Collision Resolution" by R. Garces and J. J. Garcia-Luna-Aceves, Proc. ACM MOBICOM 96, pp. 187–197, 1996 (related art 10)). CARMA-NTG (Collision Avoidance and Resolution Multiple Access Protocol with Non-Persistent Trees and Transmission Groups), in which a node acquired a transmission right by the CARMA configures a transmission group, is also proposed by R. Garces, etc. ("Collision Avoidance and Resolution Multiple Access with Transmission Groups" by R. Garces and J. J. Garcia-Luna-Aceves, Proc. IEEE INFOCOM '97, pp. 134–142, 1997 (related art 11)).

Further, DQRUMA for making a reservation of a data transmission channel by an aloha method with a slot or the stack algorithm and, when the data transmission channel is obtained, maintaining the reservation using a piggyback request is proposed ("Distributed-Queuing Request Update Multiple Access (DQRUMA) for Wireless Packet (ATM) Networks" by M. J. Karol, Z. Liu, and K. Y Eng, Proc. of ICC '95, pp. 1224–1231, June, 1995 (Related art 12)).

Especially, the DQRUMA for reserving a data slot by the stack algorithm is an efficient protocol, which is stable even at a time with a high load.

The DQRUMA (related art 12); which is a basis of this invention; is outlined.

The DQRUMA is an efficient channel access protocol with a request-time-allocation type, which is designed for a packet in a fixed length.

FIG. 12 shows a configuration chart of time slots in the DQRUMA protocol.

In the DQRUMA, a transmission between terminals is relayed by a base station using a time slot 1201. Each of time slots 1202 in an up-link, transmitted by the terminals and received by the base station, is divided into a request access channel 1204 and a data transmission channel 1206. A piggyback request flag 1205 is used by a user, who has obtained a data transmission channel once, for adding a request information of a data transmission consecutively. Each of time slots 1203 in a down-link transmitted by the base station and received by the terminals is divided into a request access response channel 1207, a data transmission permission channel 1208, and a data transmission channel 1209. In the base station, there is a request table with an entry for each of all the terminals in a cell. Each entry in the table includes a terminal identifier and a transmission request information (if the terminal still maintains transmission data). The DQRUMA protocol can be divided into a request access phase and a data transmission phase.

At first, explanations are made on the request access phase.

When the transmission data are generated, the terminal transmits a transmission request (of which content is the terminal identifier) to the base station using the request access channel 1204 in an up-link. The request access channel 1204, i.e., a random access channel, is shared by all the terminals. Therefore, a collision can occur in the request access channel 1204, and the aloha method with a slot or a binary-stack algorithm is used to prevent the collision. When the transmission request is received from the terminal normally, the base station sets a flag indicating that the terminal maintains transmitting data in the request table. The base station reports that the transmission request is accepted by broadcasting the received terminal identifier using the request access response channel 1207 in the down-link. When the acceptance of the request is reported, the terminal receives the data transmission permission channel 1208 in the down-link, while waiting for an allocation of the data transmission channel 1206 to the terminal.

Explanations are made on the data transmission phase.

The base station selects one of the terminals with the transmission request in the request table in accordance with a requested data transmission policy, e.g., a round robin, and permits the data transmission in a next time slot. This is reported by broadcasting the terminal identifier using the data transmission permission channel 1208 in the down-link. When the terminal transmits the data using the data transmission channel 1206 in the up-link, the terminal reports to the base station if any transmitting data are left by the piggyback request 1205. The base station checks the piggyback request 1205, and updates the entry in the request table.

When there is no transmission request in the request table, the base station reports that the data transmission channel 1206 in the next up-link is converted to a plurality of request access channels 1204 using the data transmission permission channel 1208 in the down-link. The data transmission channel 1209 in the next down-link is also converted to a plurality of request access response channels 1207 synchronously for responding to a plurality of request accesses.

In the DQRUMA protocol, the collision occurs only in the request access channel 1204, and the piggyback request 1205 can be transmitted without the collision. Therefore, the collision of the request in the random access protocol is reduced dramatically, and the system capacity at the time with a high load is improved tremendously. Further, since the base station appoints the terminal which transmits the data for each of the slots, the DQRUMA can satisfy requests of various services.

The DQRUMA is a method mainly related to the request access channel 1204 in the data transmission channel, and no concrete proposal is made on an allocation method of the data transmission channel 1206 for the accepted request. Further, no discussion is made on the transmission between cells. Therefore, a protocol in the cell for the transmission between the cells is not proposed.

As the channel allocation method using the channel request method of the DQRUMA, a method for transmitting data with requests of various services, voice, etc. is proposed by Yamamoto, Machida, and Ikeda ("Access Control Scheme for Multimedia Wireless ATM (Asynchronous Transfer Mode) Local Area Networks" by M. Yamamoto, S. Machida, and H. Ikeda, Proc. of 3rd Asia-Pacific Conference on Communications (APCC '97), Sydney, Australia, December, 1997 (Related art 13)).

As stated, in the DQRUMA, no consideration is made on a direct transmission and receipt of the data (also called as a direct communication) between mobile terminals in the communication within the cell. Further, no consideration is made on an omission of a data transmission channel in the transmission between the cells, either. Therefore, the utilization method of the channel is wasteful. Further, there remains the possibility of improving the performance and lowering the delay.

This invention is most close to the DQRUMA among the related arts. However, this invention is also related to RAMA proposed by Amitay ("Resource Auction Multiple Access (RAMA): Efficient Method for Fast Resource Assignment in Decentralized Wireless PCS (Personal Communications Services)" by N. Amitay, Electron. Lett., vol. 28, no. 8, pp. 799–801, Apr. 9, 1993 (Related art 14)), PRMA (Packet Reservation Multiple Access) proposed by Goodman, etc. ("Packet Reservation Multiple Access for Local Wireless Communications" by D. J. Goodman, R. A. Valenzuela, K. T. Gayliard, and B. Bamamurthi, IEEE Trans. Commun., vol. COM-37, pp. 885–890, August 1989 (Related art 15)), PRMA++ proposed by Vile ("A Reservation Multiple Access Scheme for an Adaptive TDMA (Time Division Multiple Access) Air Interface" by J. De Vile, Proc. Fourth WINLAB Workshop on Third Generation Wireless Information Networks, N. J., 1993 (Related art 16)), SIR (Service Integration Radio Access) proposed by Anastasi, etc. ("A Bandwidth Reservation Protocol for Speech/Data Integration in TDMA-Based Advanced Mobile Systems," by G. Anastasi, D. Grillo, L. Lenzini, and E. Mingozzi, Proc. IEEE INFOCOM '96, San Francisco, Calif., 1996 (Related art 17)), and SIP (Service Integration for Radio Access)++ proposed by Anastasi, etc. ("An Access Protocol for Speech/Data/Video Integration in TDMA-Based Advanced Mobile System" by G. Anastasi, D. Grillo, L. Lenzini, and E. Mingozzi, IEEE Journal on Selected Areas in Communications, Vol. 15, No. 8, pp. 1498–1510, October, 1997 (Related art 18)).

SUMMARY OF THE INVENTION

According to one aspect of this invention, a base station includes a time slot configuration determiner for determining a time slot configuration dynamically.

According to another aspect of this invention, a terminal includes a direct normal receipt judging unit for judging that data are received from another terminal directly, and a direct normal receipt report transmitter for transmitting a direct normal receipt report indicating a receipt of the data from another terminal to a base station.

According to another aspect of this invention, a terminal includes a channel sequence report judging unit for judging a report of a channel sequence transmitted by a base station, and a channel sequence controller for controlling the channel sequence based on the report of the channel sequence.

According to another aspect of this invention, a communication method, in which data are communicated between a terminal and a base station using a time slot including a plurality of channels, is provided. The communication method includes a step of selecting at least a channel among the plurality of channels and configuring the time slot based on the selected channel.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

DETAILED DESCRIPTION OF THE INVENTION

Figure 1:
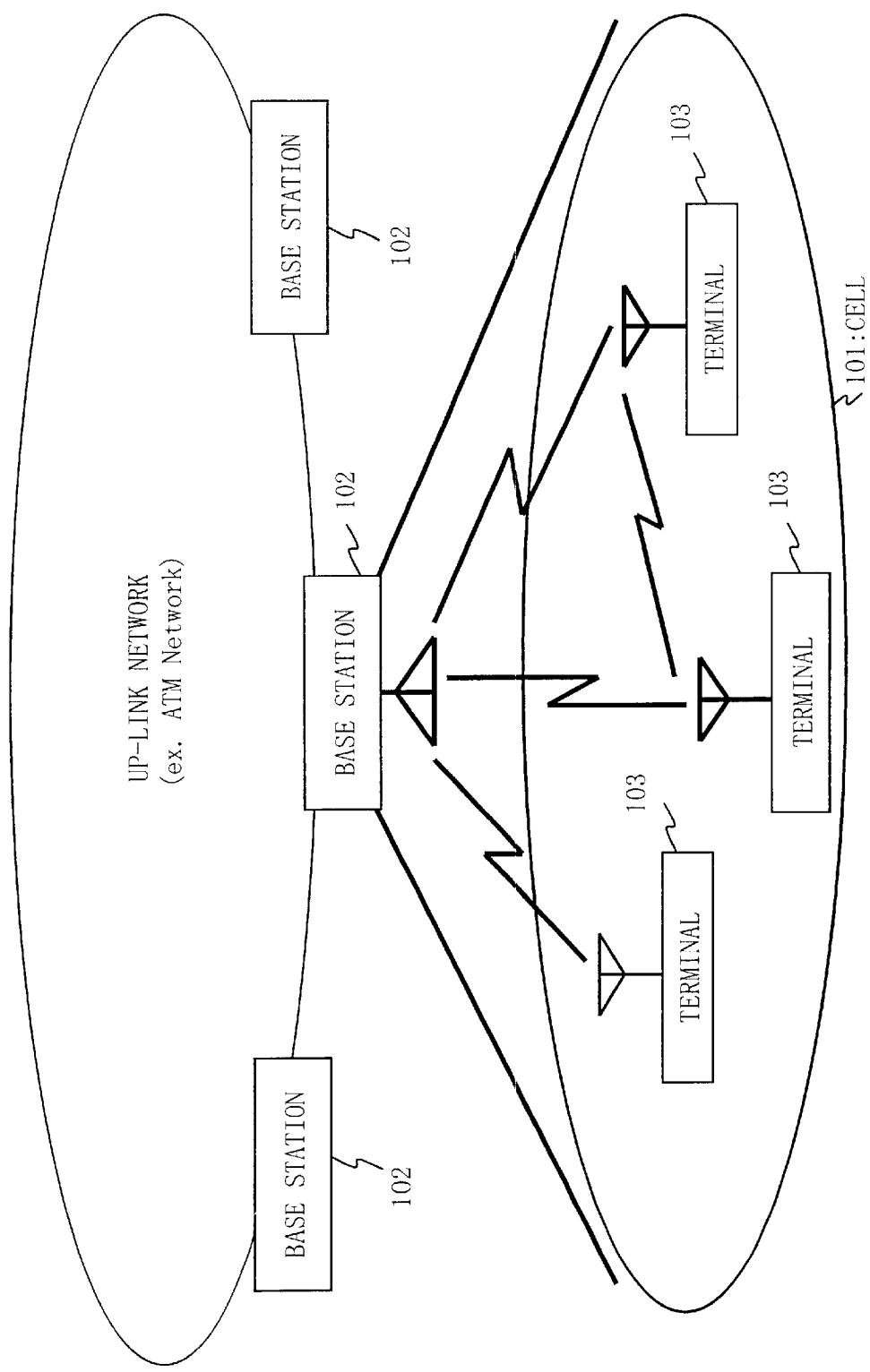
FIG. 1 shows a configuration chart of a wireless network in embodiment 1 (DRCP)

Explanations on this invention are made based on embodiments illustrated in the drawings.

Embodiment 1

In embodiment 1, explanations are made on a multiple access protocol (Direct and Relay Communication Protocol via Wireless Networks, called DRCP, hereinafter), which is improved from the DQRUMA.

As illustrated in FIG. 1, DRCP is intended for a wireless network including a base station 102 and many mobile terminals 103 (also called terminals, hereinafter) for a cell 101. The mobile terminals 103 store messages, which have been generated asynchronously, divide the messages into packets of fixed lengths, and send them to other mobile terminals 103 in accordance with a channel access protocol. The base station 102 and mobile terminals 103 use a wireless channel for transmitting and receiving, by dividing a common frequency band into time slots. Basically, in the DQRUMA, the frequency band is divided into an up-link for transmitting the data from the mobile terminals 103 to the base station 102 and a down-link for broadcasting the data from the base station 102 to the mobile terminals 103. However, in the DRCP, the mobile terminals 103 and the base station 102 share a single frequency band, and the mobile terminals 103 can directly send and receive the data to each other.

In the system explained in embodiment 1, the base station 102 and mobile terminals 103 communicate using a wireless channel. The wireless channel becomes the time slot (also called slot, hereinafter).

Figure 2:
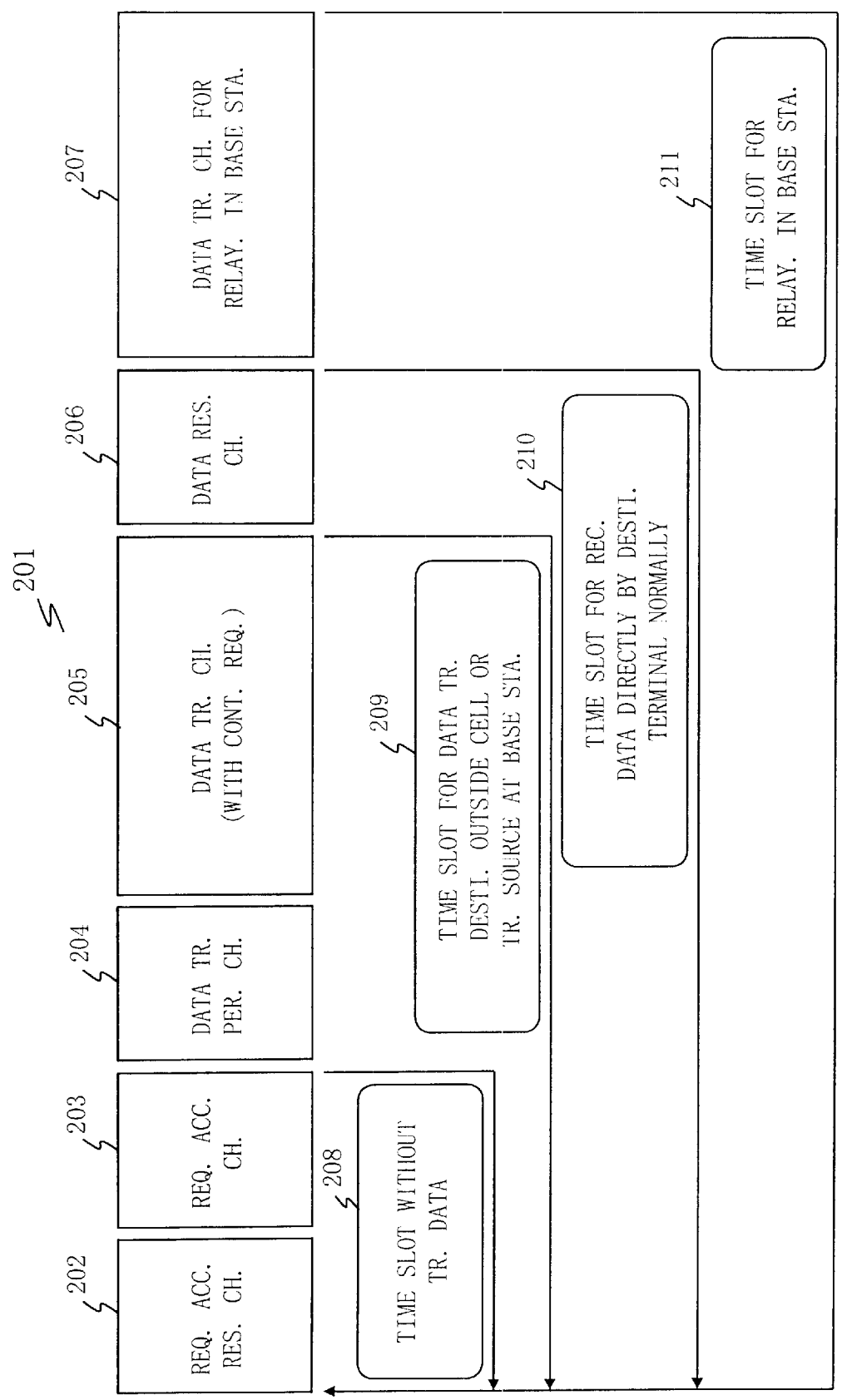
FIG. 2 shows a configuration chart of a time slot in embodiment 1 (DRCP)

FIG. 2 shows a configuration chart of the time slot in the DRCP.

A slot 201 includes six channels, i.e., a request access response channel 202, a request access channel 203, a data transmission permission channel 204, a data transmission channel 205, a data response channel 206, and a data transmission channel 207 for relaying in a base station. The request access response channel 202, request access channel 203, data transmission permission channel 204, and data response channel 206 are called control channels. Data for reservation, reservation acceptance, etc. sent using the control channels are called control data.

The slot 201 includes the above six channels or their subsets, and a sequence of a channel which configures the slot 201 is fixed in four types (208, 209, 210, and 211) as shown in the configuration of the time slots in FIG. 2.

The request access response channel 202 is used to report a result of a reservation of the data transmission channel 205, which is transmitted from the terminal 103 to the base station 102 using the request access channel 203 in a previous slot, from the base station 102 to the terminals 103.

The request access channel 203 is used to reserve the data transmission channel 205 from the terminals 103 to the base station 102.

The data transmission permission channel 204 is used by the base station 102 to report an information of a terminal to which a next data transmission channel 205 is allocated.

The data transmission channel 205 is used by the terminals 103 (or base station 102) for transmitting the data. The terminals 103 can re-reserve the data transmission channel 205, contention-free, using a piggyback request flag.

When the terminal 103 at a destination, normally receives the data from the terminal 103 at a transmission source, the data response channel 206 is used by the terminal 103 to respond to the base station 102 (not the terminal 103 at the transmission source).

The data transmission channel 207 for relaying in the base station is used by the base station 102 to relay the data in case that a normal receipt is not reported to the data response channel 206.

The control data includes a channel identifier and data, e.g., a terminal identifier, etc. The data, such as the terminal identifier, etc., show the following information, depending on the type of the channel.

Data for the request access response channel 202, is an identifier of a terminal which has accepted the reservation, reservation collision, or no reservation. Data for the request access channel 203, is an identifier of a terminal which has transmitted the reservation. Data for the data transmission permission channel 204, is an identifier of a terminal which has permitted the data transmission. Data for the data response channel 206, is an identifier of a terminal which has received normally.

Explanations are made on basic operations in this configuration.

Figure 3:
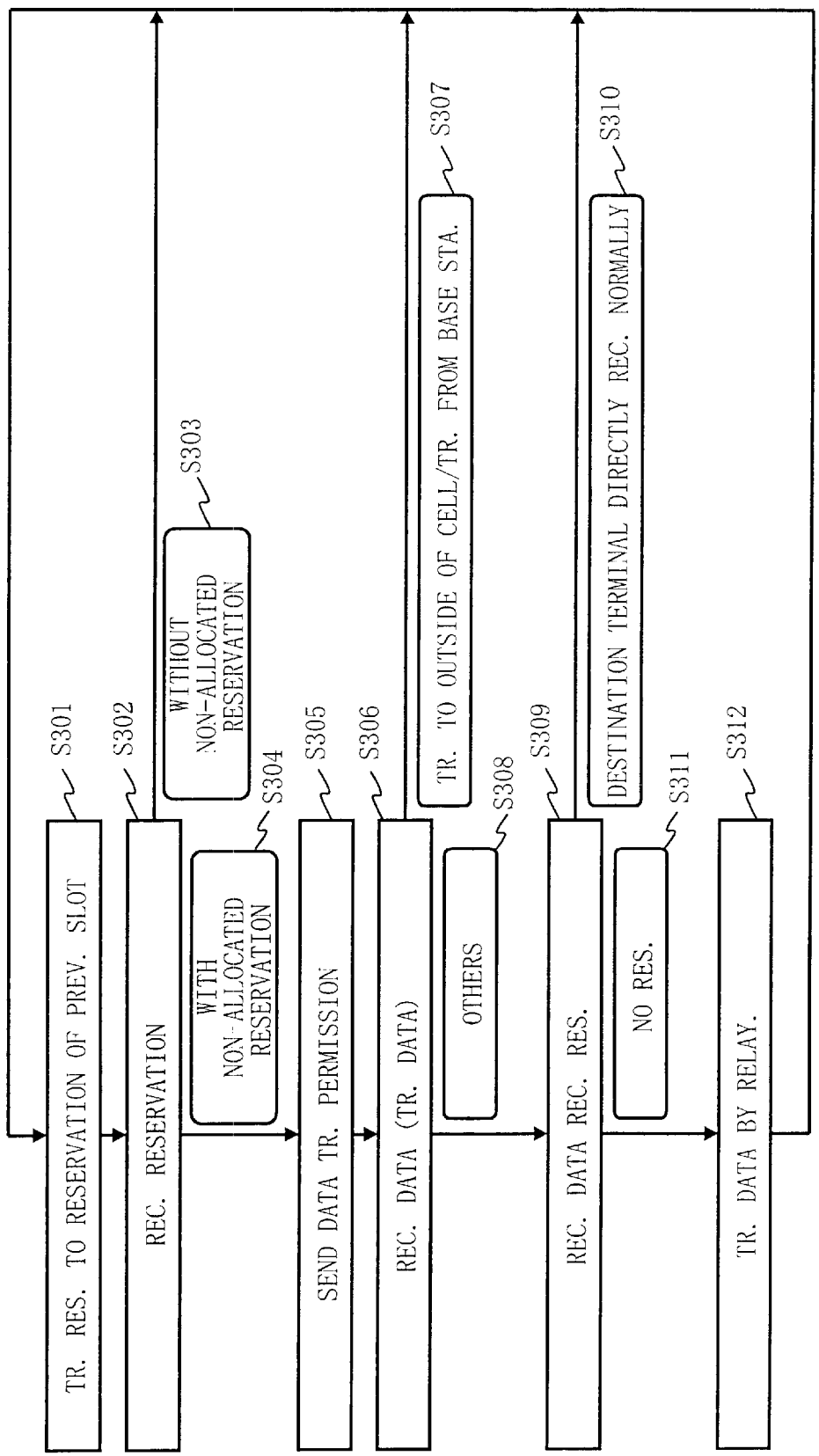
FIG. 3 shows a flow chart of a processing in a base station in embodiment 1 (DRCP)
Figure 4:
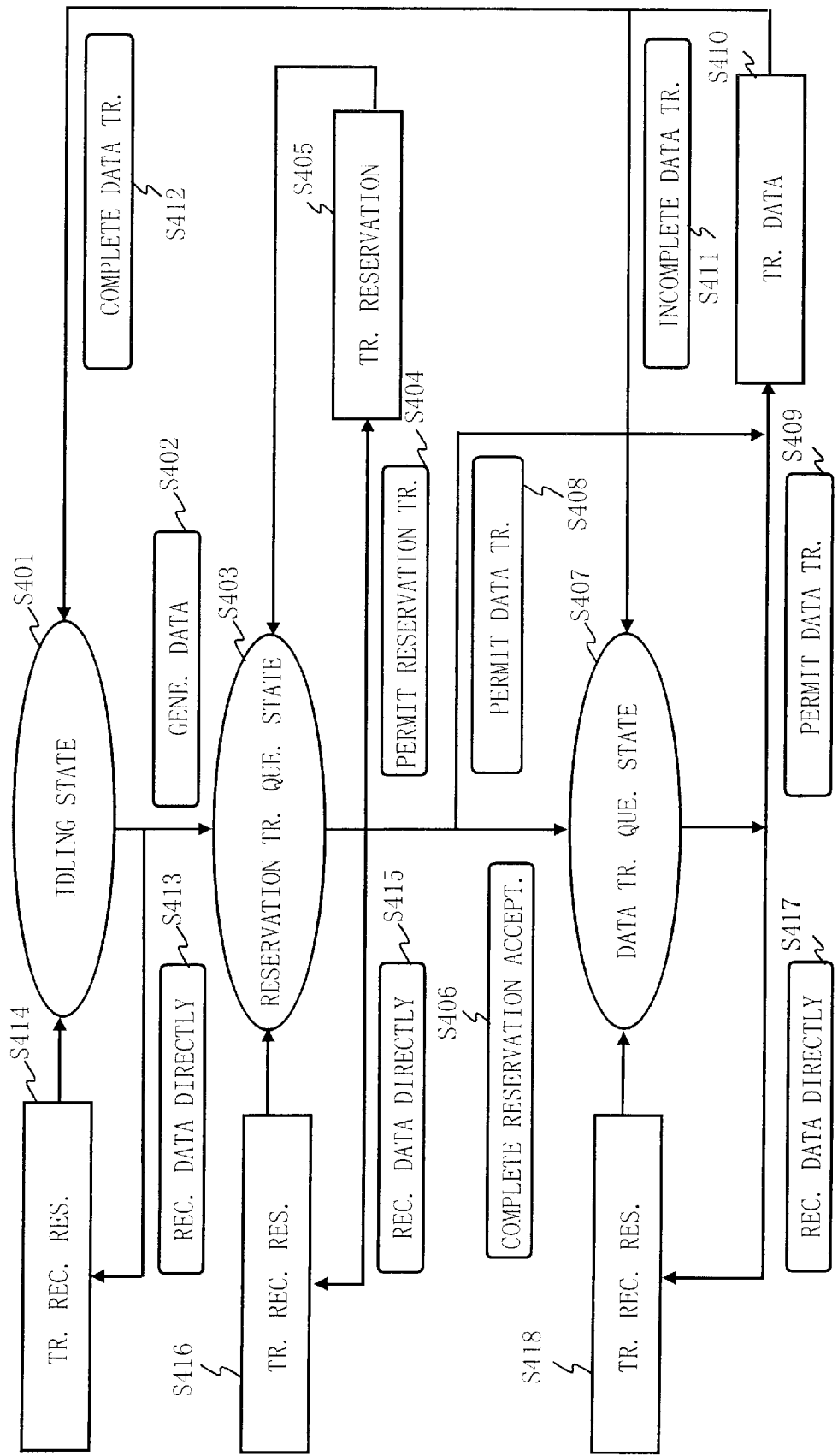
FIG. 4 shows a flow chart of a transmission processing in a terminal in embodiment 1 (DRCP)
Figure 5:
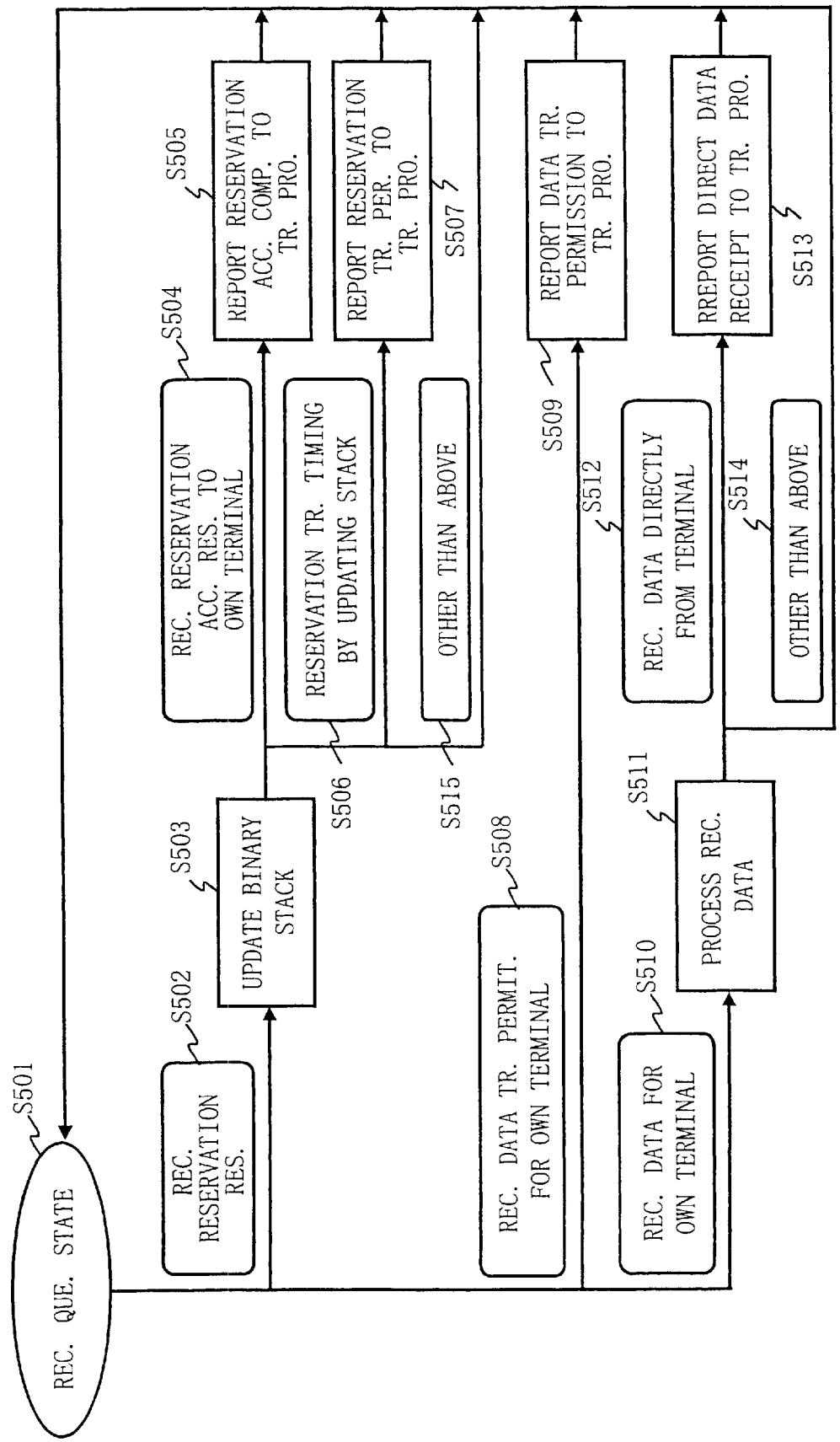
FIG. 5 shows a flow chart of a receiving processing in the terminal in embodiment 1 (DRCP)

A flow chart of processing in the base station is shown in FIG. 3. A flow chart of transmission processing in the terminal is shown in FIG. 4, and a flow chart of receipt processing in the terminal is shown in FIG. 5.

At first, a flow of the DRCP protocol is outlined. The base station 102 reports a result of a reservation request of the data transmission channel, which is transmitted from the terminal 103 to the base station 102 using the request access channel 203 in a previous slot 201, to all the terminals 103 using the request access response channel 202 (step S301).

Based on the response to the reservation received from the request access response channel 202 (step S502), all the terminals 103 update their binary stacks (step S503). If there is data to be transmitted and one of the terminals, is able to transmit (steps S506 and S507), the reservation is transmitted using the request access channel 203 (steps S404 and S405).

The base station 102 allocates the data transmission channel 205 based on the reservation received from the request access channel 203 (step S302) and the reservation which has been received (step S304), and reports the terminal information to the data transmission permission channel (step S305). When there is no reservation, the processing goes back to step S301 immediately without using the data transmission permission channel (step S303).

The terminal 103, to which the data transmission channel 205 is allocated (steps S408 and S409), transmits the data using the data transmission channel 205 (step S410). In a case that there remains transmitting data (step S411), the piggyback request flag is set. In a case of either (a) or (b) (for the communication between the cells), described below, the base station 102 does not need to relay, and the processing goes back to step S301 (step S307).

(a) The destination of the transmission is a terminal outside the cell.

(b) The base station transmits, i.e., the terminal outside the cell originates the transmission, and the base station relays.

In a case that the destination terminal of the data transmission directly receives the data normally (step S512), a normal receipt response is sent to the base station 102 using the data response channel 206 (step S513). It is not necessary that this normal receipt response is received by the terminal 103 at the transmission source. In a case that the terminal 103 at the transmission destination has not received the data normally, the channel becomes a vacant channel. In a case that a normal receipt response is made, the processing returns to step S301 (step S310).

In a case that there is no normal receipt response in the data response channel 206 (step S311), the base station 102 relays the data using the data transmission channel 207 for relaying in the base station (step S312). Then, the processing returns to step S301.

The request access response channel 202 is before the request access channel 203 in the time slot 201, as the base station 102 determines a configuration of the slot dynamically, and reports its channel sequence to the terminal 103 using the request access response channel 202 and the data transmission permission channel 204.

The terminal 103 performs a transmission processing and a receipt processing. A detailed explanation is made on a flow of the transmission processing in the terminal 103, which is shown in FIG. 4.

When the data is generated, an idling state without transmitting data (step S401) moves to a reservation transmission queuing state (step S403) (step S402).

In the reservation transmission queuing state (step S403), depending on a report from the receipt processing, the processing goes to one of the following:

(a) If the report is a reservation transmission permission (step S404), a reservation is transmitted using the request access channel (step S405), and the processing returns to the reservation transmission queuing state (step S403);

(b) If the report is a reservation acceptance completion (step S406), the processing moves to a data transmission queuing state (step S407); and (c) If the report is a data transmission permission (step S408), the processing moves to the processing performed when the data transmission permission report is received at the data transmission queuing state (step S410).

When the data transmission permission is reported through the receipt processing shown in FIG. 5 (step S409) at the data transmission queuing state (step S407), depending if there remains transmitting data beside the data which are transmitted this time, the processing goes to one of the following:

(a) If there remains the transmitting data, a continuation request, i.e., a piggyback request flag, in the data transmission channel 205 is turned on, and the data are transmitted (step S410), and the processing goes back to the data transmission queuing state (step S407) (step S411); and (b) If there remains no transmitting data, the piggyback request flag is turned off, and the data are transmitted (step S410), and the processing goes back to the idling state (step S401) (step S412).

When a direct receipt of the data through the receipt processing as shown in FIG. 5 is reported at any one of the idling state (step S401), the reservation queuing state (step S403), and the data transmission queuing state (step S407) (steps S512, S513, S413, S415, and S417), a data receipt response is transmitted to the base station 102 using the data response channel 206 (steps S414, S416, and S418), and the processing goes back to the original state (steps S401, S403, and S407).

A detailed explanation is made in FIG. 5 of a flow of the receipt processing in the terminal.

The receipt processing in the mobile terminal 103 is always at a receipt queuing state (step S501).

When the terminal 103 receives a response to the reservation from the base station using the request access response channel 202 (step S502), the terminal 103 updates the binary stack based on the response (step S503). (As an updating method of the stack, there is a method disclosed in the related art 12, for example.) Then, depending on conditions, the processing goes to one of the following:

(a) If a received response is an acceptance report on a reservation of the terminal, itself (step S504), a reservation acceptance completion is reported to a transmission processing as shown in FIG. 4 (steps S505, S406), and the processing goes back to the receipt queuing state (step S501);

(b) If the terminal, itself, can perform the reservation transmission using a next request access channel by updating the binary stack (step S506), a reservation transmission permission is reported to the transmission processing as shown in FIG. 4 (steps S507 and S404), and the processing goes back to the receipt queuing state (step S501); or (c) If the conditions are not described in (a) and (b), the processing goes back to the receipt queuing state immediately (step S501).

If a data transmission permission is received by the terminal 103, itself, from the base station 102 using the data transmission permission channel 204 (step S508), the data transmission permission is reported to the transmission processing (steps S509, S408, and S409), and the processing goes back to the receipt queuing state (step S501).

If the data are received by the terminal, itself (step S510), the receipt processing of the data is performed (step S511). If the data are received from another terminal normally (step S512), a data direct receipt is reported to the transmission processing as shown in FIG. 4 (steps S513, S413, S415, and S417). Then, the processing goes back to the receipt queuing state (step S501).

Embodiment 2.

In embodiment 2, explanations are made on the method improved from the DQRUMA, in which an up-link for a terminal transmission—a base station receipt and a down-link for a base station transmission—a terminal receipt are shared in a frequency band by time-division-multiplexing and a time slot configuration is changed dynamically.

Figure 6:
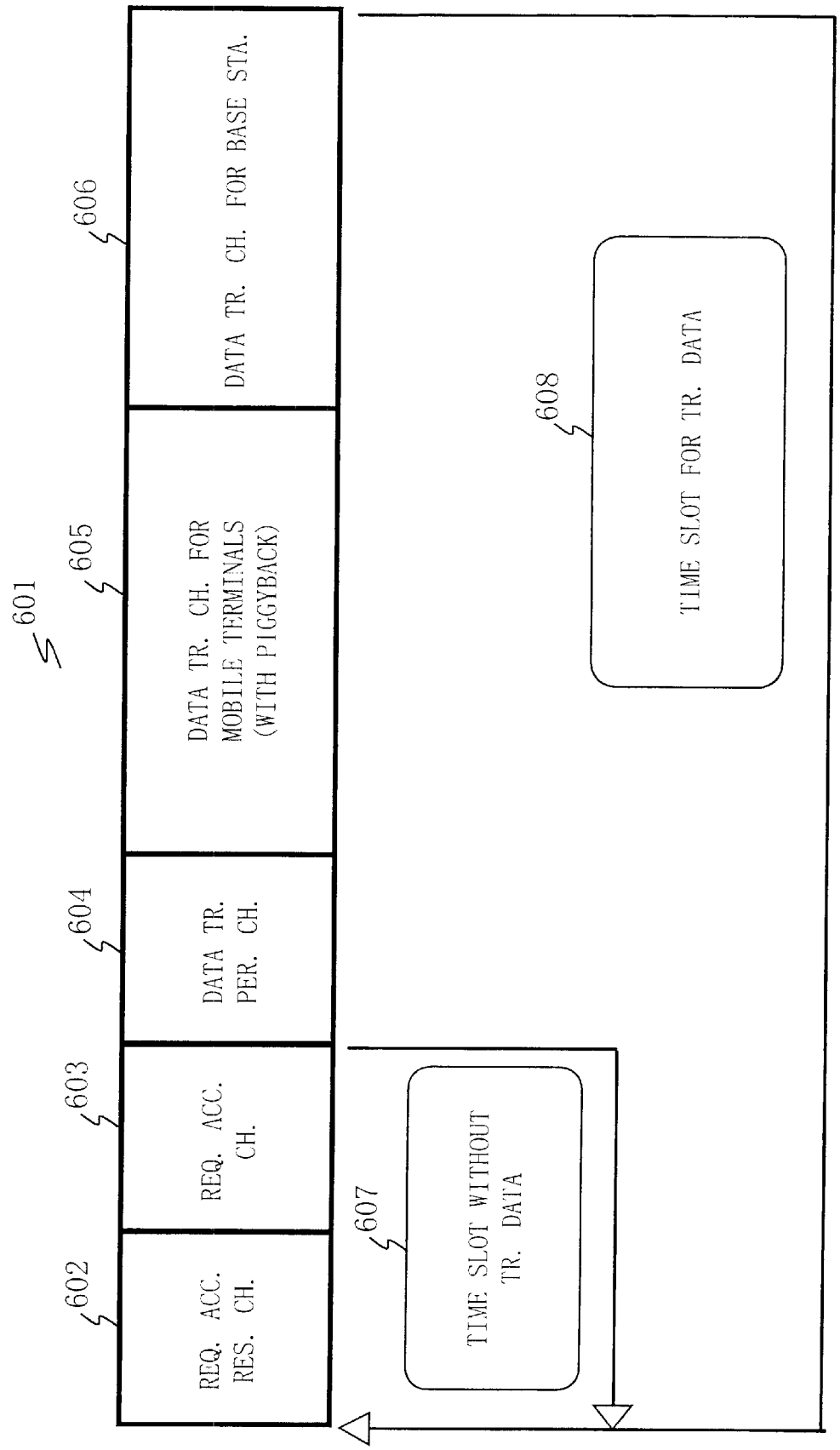
FIG. 6 shows a configuration chart of the time slot in embodiment 2 (improved DQRUMA)

FIG. 6 shows a configuration chart of the time slot, in which the up-link and the down-link perform the time-division-multiplexing of a same frequency band in embodiment 2.

In the related art, when two frequency bands are used, a whole data transmission channel is converted to a plurality of reservation access channels. However, in embodiment 2, a method for changing the time slot configuration dynamically with a high channel efficiency is provided as in embodiment 1 (DRCP).

Embodiment 2 is a simplified method of embodiment 1 (DRCP). The processing in steps S307, S309, and S310 in the flow in the base station shown in FIG. 3, the processing in steps S413, S414, S415, S416, S417, and S418 in the flow of the transmission processing in the terminal shown in FIG. 4, and the processing in steps S512 and S513 in the flow of the receipt processing in the terminal shown in FIG. 5 in embodiment 1 are omitted to realize embodiment 2.

Herein below, explanations are made on an evaluation result of a comparison, based on a simulation, of the performance of embodiment 1 (DRCP) and embodiment 2 (improved DQRUMA).

In an evaluation of a performance of the access method, a worst value is an important factor. However, an average value is used for the evaluation under a premise that when all the mobile terminals 103 transmit the reservation, a load is smoothed by shifting the identifiers of the terminals 103 in accordance with the binary stack algorithm. Various improved methods of the binary stack algorithm are proposed (related art 2, related art 3, and related art 7). However, in this simulation, a basic algorithm for transmitting a request by only a terminal group included in a stack at a top level is used (step S503).

The main prerequisites and parameters which were assumed in the simulation are:

(1) A system includes 128 terminals, and all the terminals have the same traffic characteristics;

(2) A transmission message is in a fixed length, and generated based on a Poisson arrival;

(3) Each of four types of the control channels contains the channel identifier of 2 bits and the information of the terminal identifier, etc. of 8 bits, which are 10 bits in total, and with a T unit time;

(4) The data transmission channel transmits 425 bits (1 ATM cell of 53 bytes and the piggyback request flag of 1 bit) with 25T unit time;

(5) A guard time of the transmission data for the channel, propagation delay time, processing time of the DRCP protocol of the terminal 103 and the base station 102, etc. are not considered;

(6) An allocation of the data transmission channel to the terminal 103 is performed by a round robin;

(7) A transmission and receipt error occurs in a direct communication between the terminals, and a communication between the base station 102 and the mobile terminals 103 is always sent and received normally;

(8) When the terminal 103 at the transmission destination is outside the cell, a simulation from a generation of a message in the terminal 103 to a receipt by the base station 102 in the same cell is performed;

(9) When the terminal 103 at the transmission source is outside the cell, a simulation from a receipt of a message by the base station 102 from an outside of the cell to a receipt by the terminal 103 is performed. In that case, as one of the terminals 103, the base station 102 reserves the data transmission channel, and relays the data; and

(10) The control channel in the DQRUMA in the related art is with the information of the terminal identifier, etc. of 8 bits. However, embodiment 2 (improved DQRUMA) is with T unit time as in embodiment 1 (DRCP).

The evaluation result of embodiment 1 (DRCP) and embodiment 2 (improved DQRUMA) are illustrated in FIGS. 7–12.

In this simulation, a 95% one-side confidence interval width of the throughput and the delay is 1% and 4% or less for each of the sample means.

Figure 7:
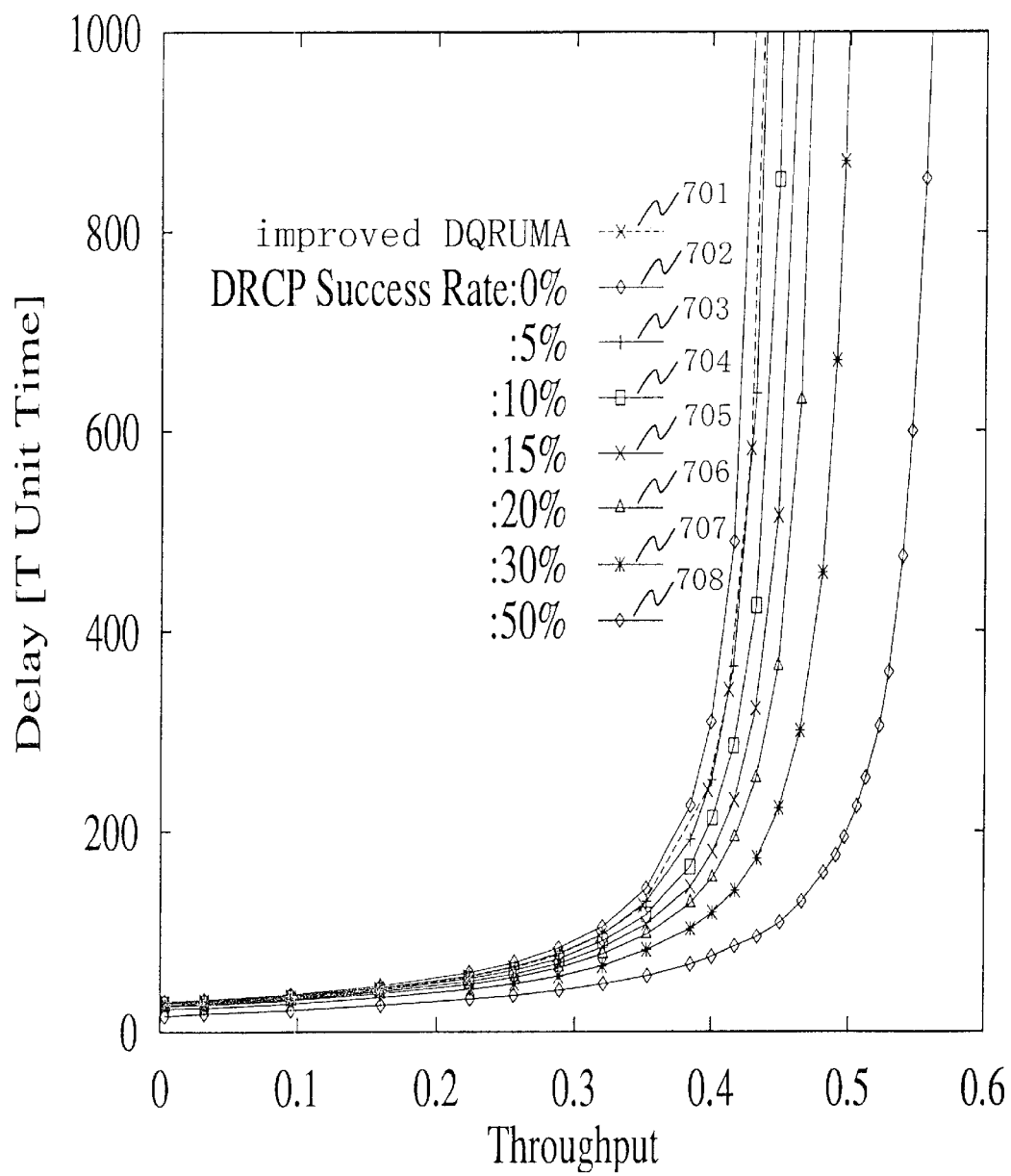
FIG. 7 shows a chart illustrating delay characteristics against a throughput in a simulation in embodiment 1 (DRCP) and embodiment 2 (improved DQRUMA)

FIG. 7 illustrates a result of a simulation with 1 message 1 ATM cell, which is a most difficult condition for both embodiment 1 (DRCP) and embodiment 2 (improved DQRUMA). In FIG. 7, a comparison is made on an average delay vs. a throughput for embodiment 1 (DRCP) and embodiment 2 (improved DQRUMA) with a direct communication success rate (Success Rate) of 0%, 5%, 10%, 15%, 20%, 30%, and 50% in a case where a rate of an outside cell ($r_{cross}$) is 0%.

In a case shown at 702 in which the direct communication success rate is 0%, which is the worst condition for embodiment 1 (DRCP), an average delay time at a time of a low throughput is worse than embodiment 2 (improved DQRUMA), shown at 701, by approximately T unit time. This difference is only 4% of a whole average delay time. This is a delay of the data response channel 206 in embodiment 1 (DRCP), which is not in embodiment 2 (improved DQRUMA). This can be confirmed from each of the slot configurations of embodiment 1 (DRCP) and embodiment 2 (improved DQRUMA), shown in FIGS. 2 and 6, respectively. However, when the direct communication success rate becomes higher, the average delay in embodiment 1 (DRCP) shows better characteristics than embodiment 2 (improved DQRUMA) even at a time of the low throughput as well as a time of a high throughput as a result of omitting the data transmission channel 207 for relaying in the base station. Concerning on the throughput, a maximum value in the case 702 of the direct communication success rate of 0% is worse than a maximum value in embodiment 2 (improved DQRUMA) 701 by 2%. This also shows a degradation of the data response channel as in the delay. However, when the direct communication success rate becomes higher, the throughput in embodiment 1 (DRCP) becomes higher. When the direct communication success rate is 5% or better (703–708), the throughput is higher than embodiment 2 (improved DQRUMA) 701.

This effect is realized by omitting the data transmission channel 207 for relaying in the base station by performing a direct communication. The direct communication success rate p (%), in which a maximum throughput of embodiment 1 (DRCP) equals a maximum throughput of embodiment 2 (improved DQRUMA), is calculated from a configuration of the time slot as follows:

$$3T+50T=(4T+25T)\times(p/100)/(100+(4T+50T)\times((100-p)/100)) \quad (1)$$

wherein p=4.

This result almost matches with the result of the simulation.

A limit value of the throughput in embodiment 2 (improved DQRUMA) is 0.5 (corresponding to 1.0 in the related art 12). However, in embodiment 1 (DRCP), when the direct communication success rate is 20% or more, it is possible to exceed 50% as illustrated in FIG. 7. This is because a data transmission channel 606 for relaying in a base station is not omitted in embodiment 2 (improved DQRUMA), however the data transmission channel 207 for relaying in the base station is omitted in embodiment 1 (DRCP).

Figure 8:
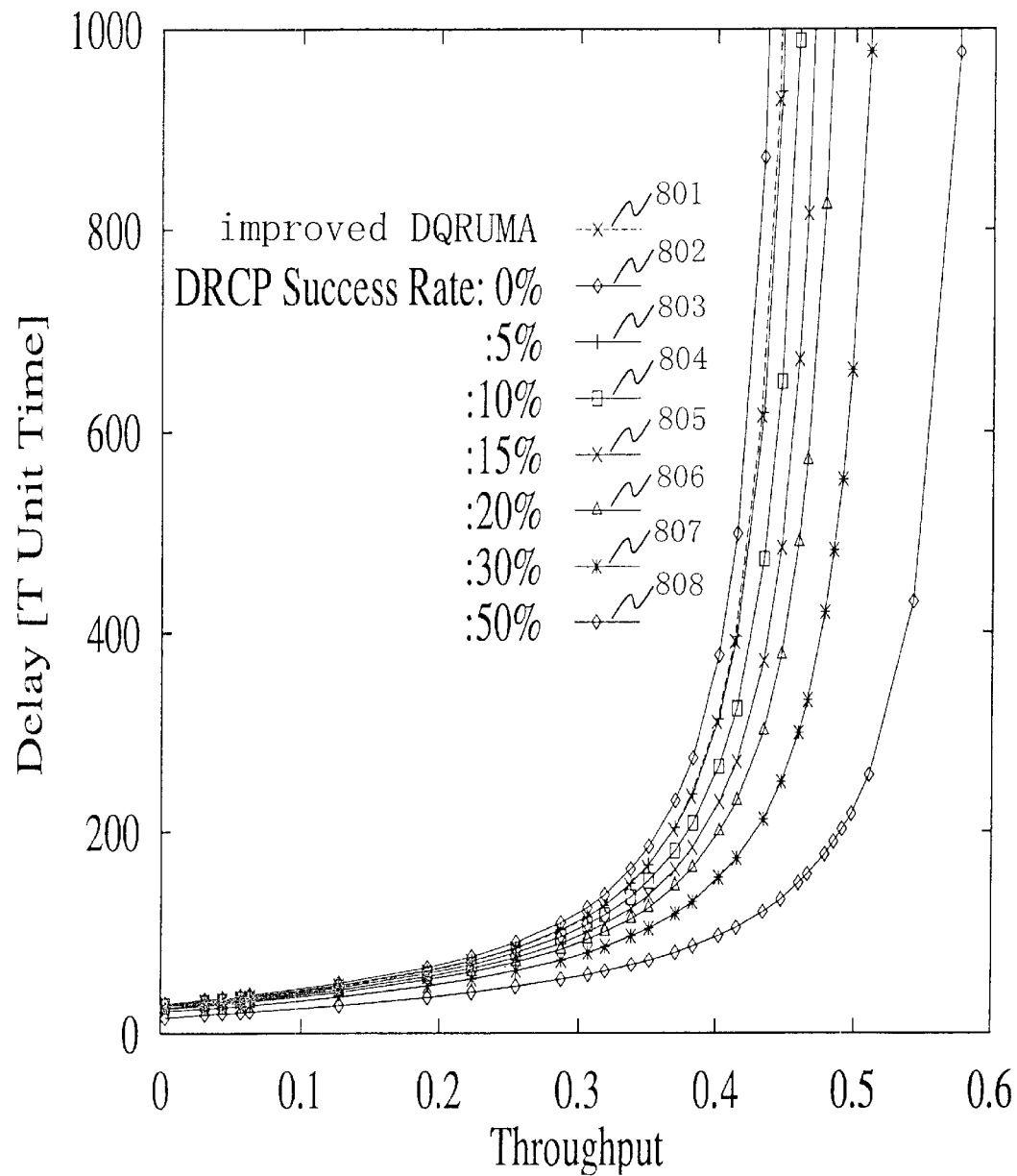
FIG. 8 shows a chart illustrating the delay characteristics against the throughput in a simulation in embodiment 1 (DRCP) and embodiment 2 (improved DQRUMA)

FIG. 8 illustrates a case with 1 message 2 ATM cells. In FIG. 8, a comparison is made on the average delay vs. the throughput for embodiment 1 (DRCP) and embodiment 2 (improved DQRUMA) with the direct communication success rate of 0%, 5%, 10%, 15%, 20%, 30%, and 50% in case where the rate of the outside cell is 0%.

This case also clearly shows a difference in performance characteristics between embodiment 1 (DRCP) and embodiment 2 (improved DQRUMA) as in the case with 1 message 1 ATM cell.

Figure 9:
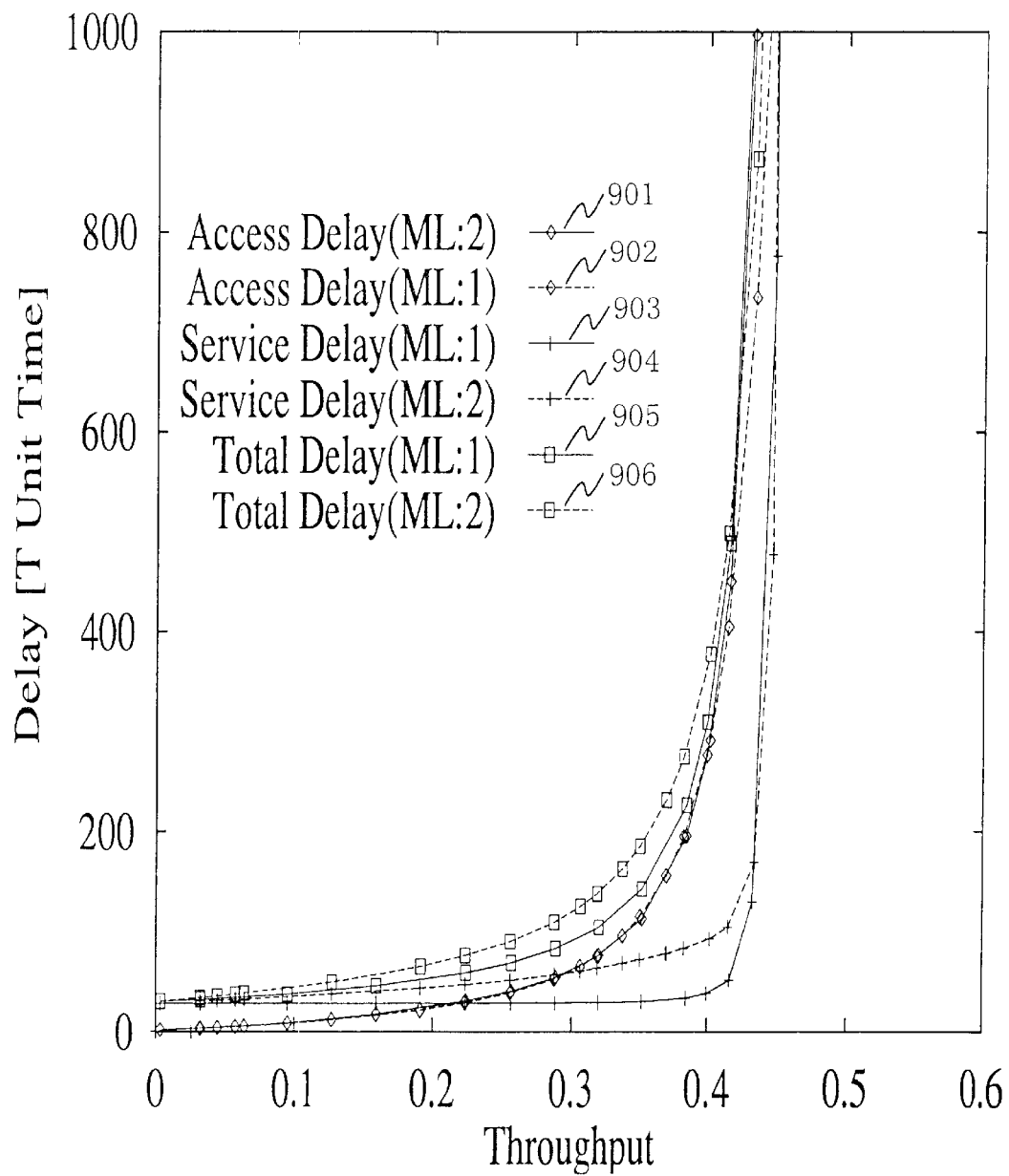
FIG. 9 shows a chart illustrating characteristics of an access delay and a service delay against a throughput in a simulation in embodiment 1 (DRCP) and embodiment 2 (improved DQRUMA)

The delay is divided into a time (called an access delay) from a generation of a message in the terminal 103 at the transmission source to an arrival of the reservation request of the data transmission channel at the base station 102 and a time (called a service delay) from a receipt of the request by the base station 102 to an arrival of the message at the receiver terminal. The delay is divided into the above two, and the average delay vs. the throughput with the direct communication success rate of 0% for a case with a message length (ML) of 1 ATM cell (ML:1) and a case of 2 ATM cells (ML:2) in embodiment 1 (DRCP) which is illustrated in FIG. 9.

When 1 message 1 ATM cell and 1 message 2 ATM cells are compared in a case that the average delay is 500 T unit time or less in which the request rarely congests, the access delay almost matches (901 and 902). This shows that the message length has little influence on the access delay, due to the configuration of the time slot which always includes the request access response channel 202 and request access channel 203. At the same time, the message length has greater influence on the service delay (903 and 904), and the difference is almost equal to a difference of the average delay (905 and 906).

An evaluation is made on the average delay vs. the throughput in embodiment 1 (DRCP) with the direct communication success rate of 0%, 5%, 10%, 15%, 20%, and 30% in a case that the rate of the outside cell is 30%.

Figure 10:
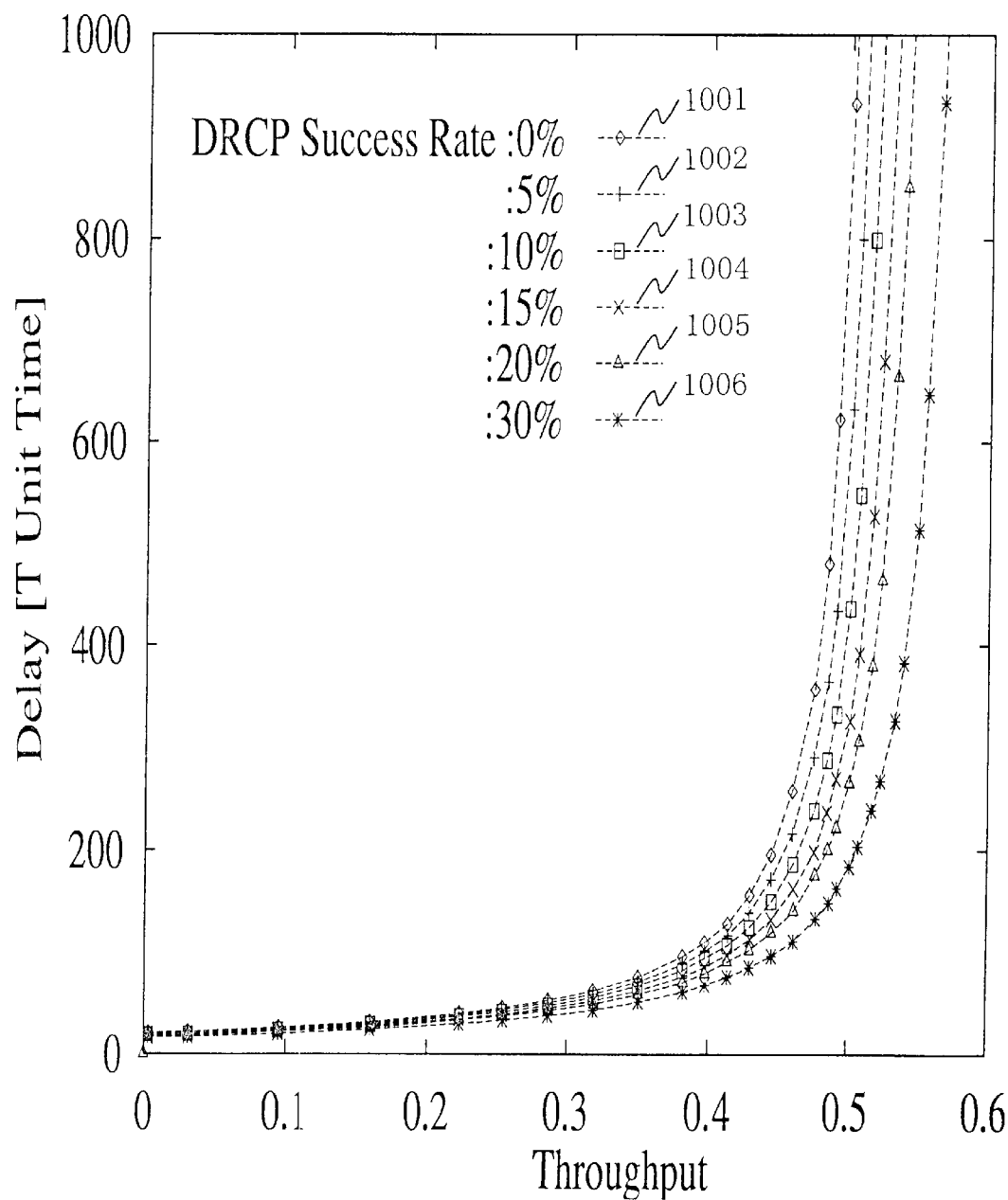
FIG. 10 shows a chart illustrating the delay characteristics against the throughput in a simulation in embodiment 1 (DRCP) and embodiment 2 (improved DQRUMA)
Figure 11:
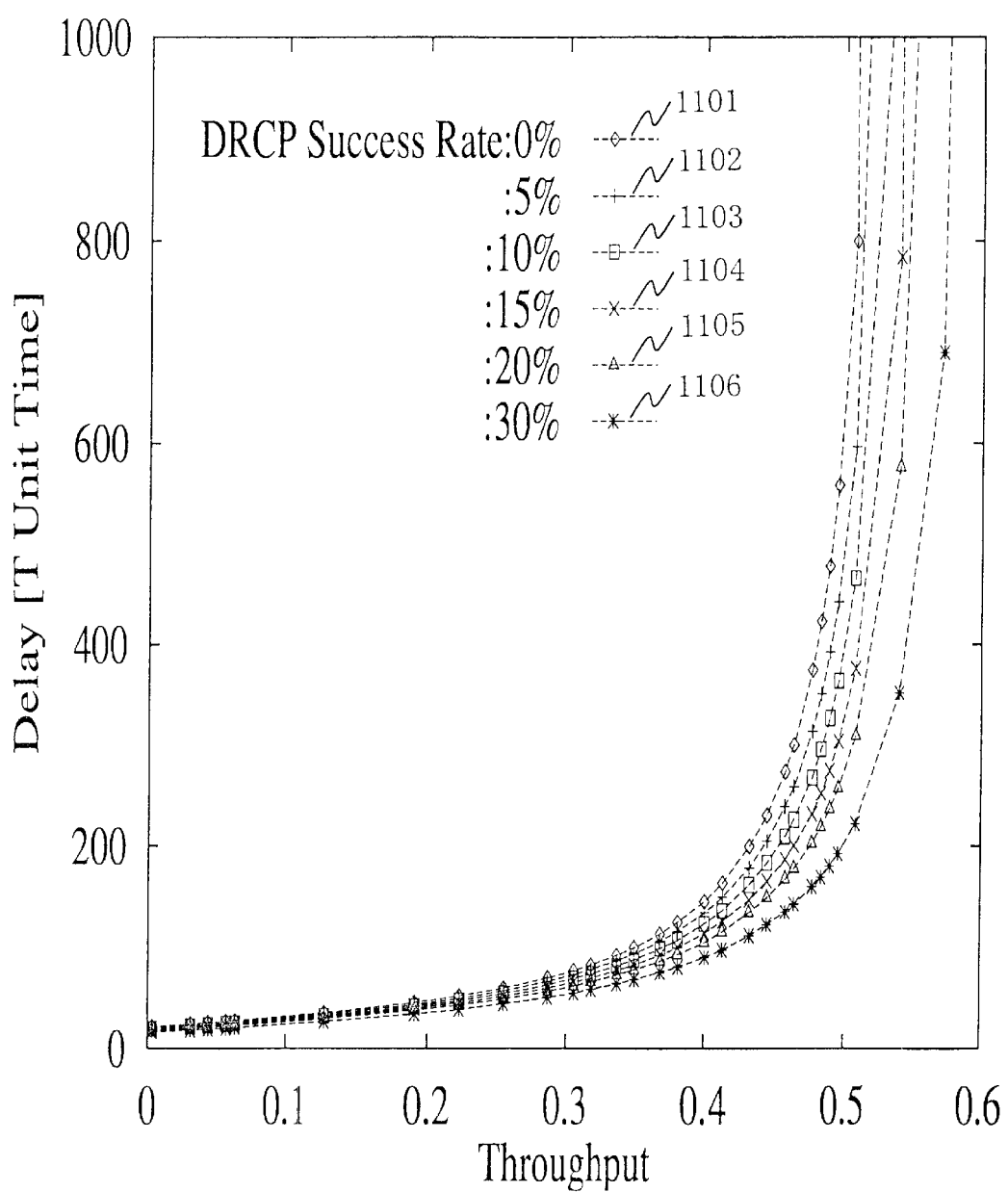
FIG. 11 shows a chart illustrating the delay characteristics against the throughput in a simulation in embodiment 1 (DRCP) and embodiment 2 (improved DQRUMA)
Figure 12:
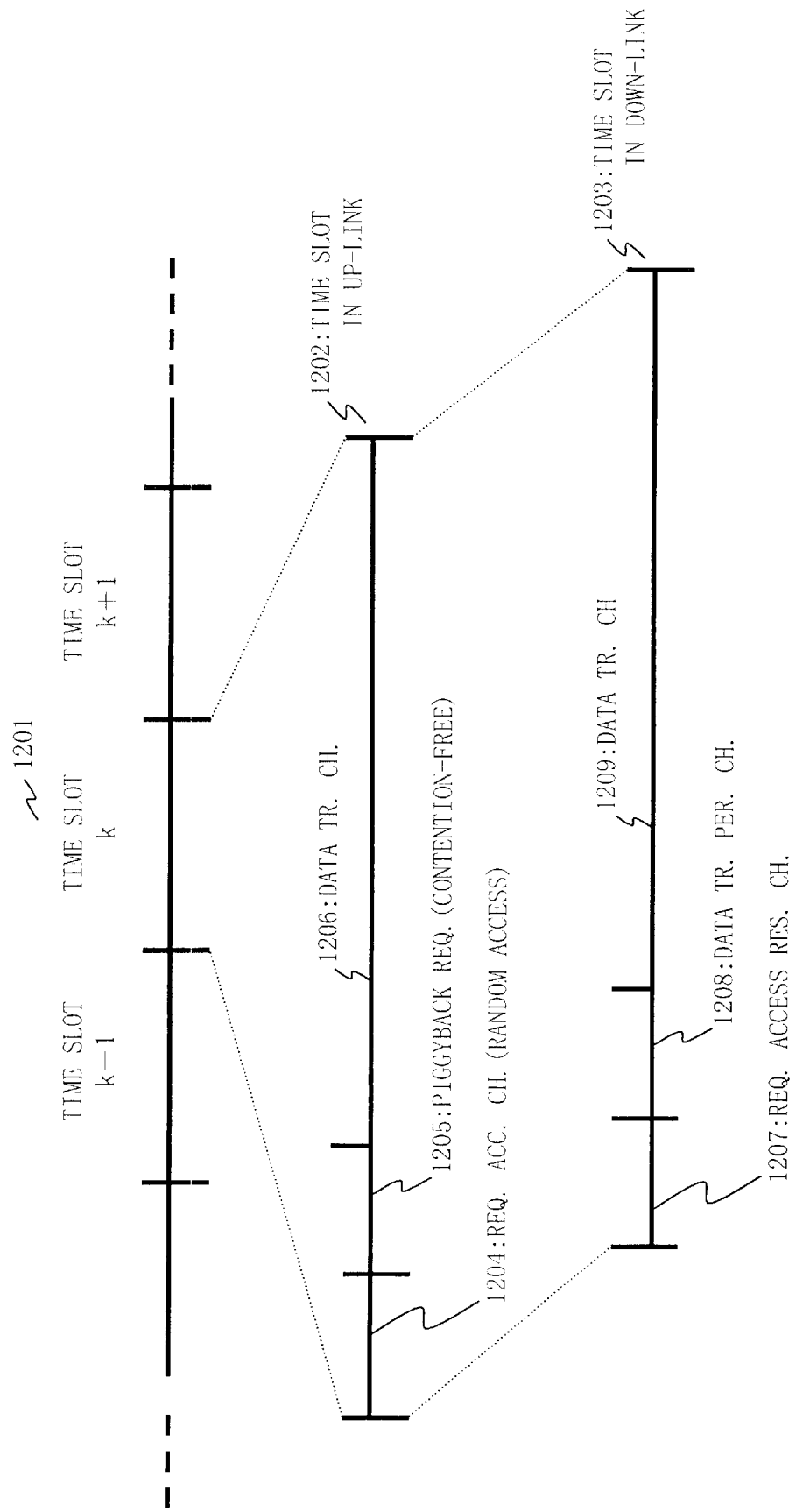
FIG. 12 shows a configuration chart of a time slot of the DQRUMA protocol.

FIGS. 10 and 11 illustrate simulation results for the case of 1 message 1 ATM cell and the case of 1 message 2 ATM cells. When these are compared with FIGS. 7 and 8, it is clear that the performance improves when the rate of the outside cell is higher. This is because the data transmission channel 207 for relaying in the base station and the data response channel 206 in embodiment 1 (DRCP) are omitted. In embodiment 1 (DRCP), a communication between the cells became able to be processed at the same time by using a same protocol with a communication within the cell. Therefore, a high throughput and a low delay are realized by a direct communication between the terminals and the communication between the cells.

In the above simulation, the evaluation was made without considering a propagation delay time between the mobile terminal 103 and the base station 102 or between the mobile terminals 103. However, when it becomes necessary to consider the propagation delay time as the cell becomes bigger, the performance drops in the DRCP and the DQRUMA. When a roundtrip delay exceeds a data transmission time, the DQRUMA protocol of a basic type, in which a time slot in a fixed length is used and separate frequency bands in the up-link and the down-link are used, can prevent the drop in performance by extending the protocol easily. As stated above, the DQRUMA can prevent the drop in the throughput by multiplexing "time-interleaved," etc.

In the DRCP protocol, the channel sequence configuring the time slot changes by a generation of the message, and a slot length changes dynamically. Therefore, even if the roundtrip delay exceeds the data transmission time, it is difficult to prevent the drop in the performance by multiplexing.

When a transmission rate of 1 Mbps and a short ATM cell (424 bits) are assumed, a data transmission time (424 $\mu$sec) exceeds a roundtrip delay of a terminal at or within a diameter of 63.6 km. Therefore, when a diameter of the cell is 63.6 km or more, the DRCP has a disadvantage compared with the DQRUMA. However, there is a tendency that the cell is becoming smaller by an effective use of the frequency and a power of the terminal. Further, in an actual system, the roundtrip delay is smaller than the data transmission time (related art 12).

The DRCP is compared with other multiple access protocols used in a wireless packet network in their performance, etc.

Resource Auction Multiple Access (RAMA) (related art 14) and Packet Reservation Multiple Access (PRMA) (related art 15) are already compared with the DQRUMA in related art 12.

In related art 12, it is disclosed that the DQRUMA has an advantage over the RAMA and PRMA concerning the delay-throughput characteristics, etc., as the RAMA takes more time for the base station 102 to know a generation of a message in the terminal 103 than the DQRUMA, and the PRMA doesn't use a last data transmission channel in a consecutive data transmission.

Therefore, since the DRCP which has better performance characteristics than the DQRUMA and succeeds most of the characteristics of the DQRUMA, e.g., allocating each of the data transmission channels to the terminal 103 and controlling by the base station 102, the DRCP also has better characteristics than the RAMA and the PRMA.

Recent studies propose PRMA ++ (related art 16), in which the PRMA is improved to a method for using a reservation packet limiting the collision to a reservation time of the data transmission channel, Service Integration Radio Access (SIR) (related art 17), in which the PRMA++ is developed to unify and control a voice and the data, and SIR++ (related art 18), in which a video is unified in addition to the voice and data. Since each of the data transmission channels is allocated by the base station 102 to the terminal 103 in each time just before the channel is used in DRCP as in DQRUMA, a flexible allocation method is possible, and it is appropriate for a multi media communication.

However, the DRCP mainly proposes the request access method of the data transmission channel. The DRCP doesn't propose any specific allocation method of the data transmission channel.

Therefore, a comparison is made by limiting to a circuit efficiency of the request access method.

In these protocols, e.g., the PRMA++ for separating the up-link for the terminal transmission-base station receipt and the down-link for the base station transmission-terminal receipt, it is impossible to have a throughput exceeding 0.5 as in the DQRUMA even if an ideal circuit efficiency is realized.

However, for the DRCP, the direct communication success rate q (%) for the throughput of 0.5 is as follows:

$$(25T/(4T+25T))\times(q/100)+$$
$$(25T/(4T+50T))\times(100-q)\times100=0.5 \qquad (2)$$

wherein q=9.28.

Therefore, when a total of the direct communication success rate and the rate of the outside cell is 10% or more, the DRCP has a better circuit efficiency than the protocols for separating the up-link and the down-link at least.

As stated above, this invention relates to the multiple access protocol (DRCP: Direct and Relay Communication Protocol via Wireless Networks), which is mainly improved from the DQRUMA to have a better channel efficiency. In embodiment 1 (DRCP), a single frequency band is used, and only when the direct transmission and receipt of the packet is unable to be made between the mobile terminals 103 in the same cell, the base station 102 relays the packet. If the direct communication succeeds, the channel for relaying in the base station is omitted, and the throughput is improved. As a result, the characteristics of embodiment 1 (DRCP) exceeds the characteristics of embodiment 2 (improved DQRUMA) when the direct communication success rate is 5% or more. Further, in embodiment 1 (DRCP), a same protocol with the communication within the cell can be used in each of the cells, in which the sender and receiver terminals are located, in the communication between the cells, and the communication between the cells can be processed at the same time. Since the channel for relaying in the base station for the communication within the cell is omitted in both of the cells, the high throughput and the low delay are realized.

For an application to a wireless ATM, a channel allocation method, etc. for ABR (Available Bit Rate), CBR (Constant Bit Rate), UBR (Unspecified Bit Rate), and VBR (Variable Bit Rate) can be considered.

In a recent mobile communication, it is becoming possible to transmit and receive the data directly (called direct communication) between the mobile terminals 103 in a cell, e.g., a transceiver function of a PHS (Personal Handy Phone System). Further, the cell tends to become smaller to utilize the frequency effectively. Therefore, a possibility of succeeding in the direct communication (called direct communication success rate) depends on the distance between the terminals 103, and it is not supposed to be low. In embodiment 2 (improved DQRUMA), all the communication is relayed by the base station. However, in embodiment 1 (DRCP), only if the direct communication is impossible, the base station relays the data. If the direct communication between the mobile terminals 103 is made normally, relaying by the base station 102 is omitted. Accordingly, a high performance and a low delay are realized by omitting the transmission channel for relaying the data.

Further, since the cell is smaller, a possibility of communication between the mobile terminals in different cells (called as the rate of outside cell) increases. Here, the communication between the terminals 103 in the same cell is called as a communication within the cell, and the communication between the terminals 103 in the different cells is called as a inter-cell communication. In case of the inter-cell communication, it is assumed that the data transmitted by the terminal 103 is transmitted by the base station 102 to the base station 102 in the cell in which the transmission destination terminal is located by using another wireless frequency band or another communication medium, which are not used in the communication within the cell. In that case, in the cell on a transmission side, the data transmission channel in the down-link for relaying the data from the base station 102 to the terminal 103 for the communication within the cell is omitted. In the cell on the receipt side, the base station 102 also transmits to the data transmission channel in the up-link for transmitting the data from the terminal 103 to the base station 102, and the down-link channel is omitted. Therefore, in the inter-cell communication between the cells, the same protocol with the communication within the cell is used in each cell, and the channel for relaying in the base station used for the communication within the cell is omitted in both of the cells. Accordingly, high throughput and low delay can be realized.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A base station comprising:
   a time slot configuration determiner for determining a time slot configuration dynamically, wherein the time slot configuration determiner determines the time slot configuration for each of time slots, and wherein the time slot configuration determiner determines the time slot configuration in a variable length;
   a data transmission channel reservation controller for controlling an allocation of a data transmission channel for a reservation of the data transmission channel; and
   a non-allocation reservation judging unit for judging that the reservation of the data transmission channel does not contain the allocation of the data transmission channel,
   wherein the time slot configuration determiner comprises a data transmission channel omission determiner for determining an omission of the data transmission channel in the time slot configuration when the reservation of the data transmission channel does not contain the allocation of the data transmission channel.

2. The base station of claim 1, wherein the time slot configuration determined by the time slot configuration determiner comprises a request access response channel and a request access channel.

3. A base station comprising:
   a time slot configuration determiner for determining a time slot configuration dynamically; and
   an inter-cell communication judging unit for judging that a communication is between cells, wherein the time slot configuration determiner comprises an omission determiner for determining an omission of a data transmission channel in the time slot configuration when the communication is between the cells.

4. The base station of claim 3, wherein the time slot configuration determined by the time slot configuration determiner comprises a request access response channel, a request access channel, a data transmission permission channel, and a data transmission channel.

5. The base station of claim 3, wherein the inter-cell communication judging unit comprises a transmission destination terminal location judging unit for judging that a terminal at a transmission destination is outside a cell.

6. The base station of claim 3, wherein the inter-cell judging unit comprises a base station data transmission judging unit for judging that the base station transmits data to a terminal using a data transmission channel.

7. A base station comprising:
   a time slot configuration determiner for determining a time slot configuration dynamically; and
   a direct normal receipt report receiver for receiving a direct normal receipt report indicating a direct receipt of data by a receiver terminal from a sender terminal, wherein the time slot configuration determiner comprises an omission determiner for determining an omission of a data transmission channel for relaying in the base station in the time slot configuration when the direct normal receipt report is received.

8. The base station of claim 7, wherein the time slot configuration determined by the time slot configuration determiner comprises a request access response channel, a request access channel, a data transmission permission channel, a data transmission channel, and a data response channel.

9. A communication method wherein data are communicated between a terminal and a base station using a time slot having a plurality of channels, the communication method comprising:

selecting at least a channel among the plurality of channels and configuring the time slot based on the selected channel, wherein the time slot comprises a request access channel for sending a transmission request from the terminal to the base station, a request access response channel for returning a response from the base station to the terminal for the transmission request sent from the terminal to the base station using the request access channel, a data transmission permission channel for informing from the base station to the terminal a permission of a data transmission from the terminal to the base station, a data transmission channel for performing the data transmission from the terminal to the base station, and a data transmission channel for relaying in the base station for transmitting the data to the terminal by relaying the data from another base station;

selecting among the data transmission permission channel, the data transmission channel, and the data transmission channel for relaying in the base station for each of time slots; and locating the request access response channel ahead of the request access channel.

10. A method of communicating data between cell networks, said method comprising the steps of:

receiving a reservation request in a base station from a terminal which reports a reservation of a data transmission channel;

allocating said data transmission channel to said terminal, based on said reservation received via a request access channel from said terminal; and determining if said data transmission channel is to be used, wherein when said data transmission channel is not used, a time slot configuration determiner configures a time slot, such that said data transmission channel is omitted from said time slot.

11. The method of claim 10, wherein said request access channel contains information relating to transmitting data to a second terminal located within a separate cell network.

12. The method of claim 10, wherein said data transmission channel is allocated by a data transmission channel reservation controller within said base station.

13. The method of claim 10, wherein said data transmission channel is used by said base station to relay data between said cells in a network.

14. The method of claim 10, wherein said time slot contains said data transmission channel when said data transmission channel is to be used.

15. The method of claim 10, wherein said time slot comprises multiple channels.

* * * * *